Oct. 28, 1941.                D. J. NELSON                2,260,537
                        GASOLINE DISPENSING HOSE
                          Filed March 18, 1940
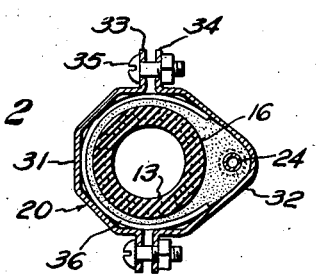
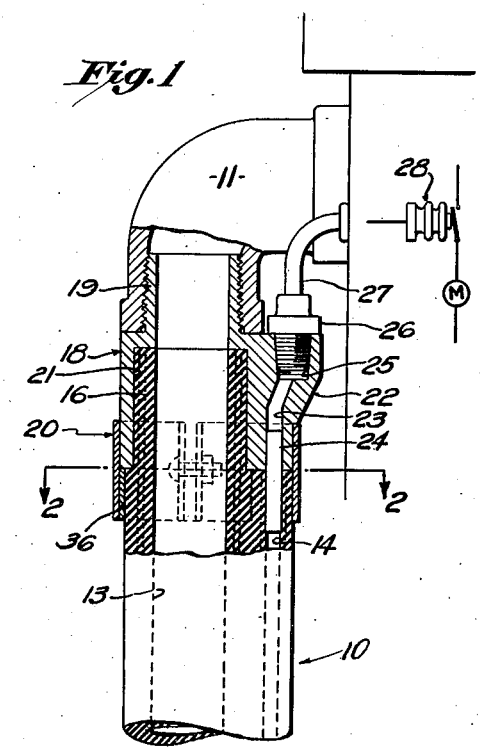
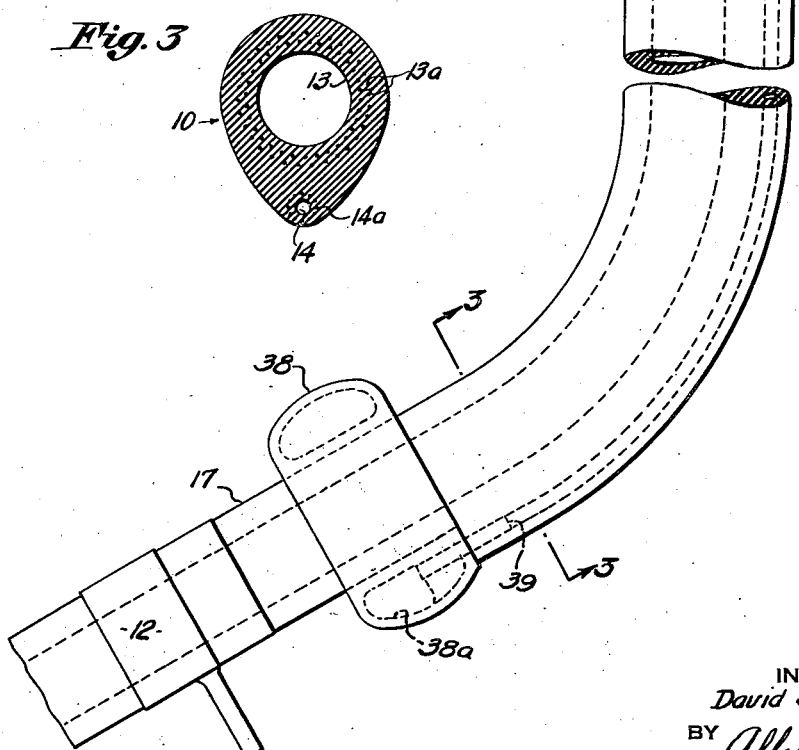
INVENTOR
David J. Nelson
BY Albert R. Henry
ATTORNEY Patented Oct. 28, 1941

2,260,537

UNITED STATES PATENT OFFICE 2,260,537

GASOLINE DISPENSING HOSE

David J. Nelson, Salisbury, Md., assignor to Martin & Schwartz, Inc., Salisbury, Md.

Application March 18, 1940, Serial No. 324,454

1 Claim. (Cl. 285—71)

This invention relates to improvements in gasoline dispensing equipment, and it is particularly directed to an improved dispensing hose which is formed with a self-contained control passage.

In my copending application Serial No. 287,111, filed July 28, 1939, now Patent No. 2,211,476, August 13, 1940, I have proposed to control the motive or pumping elements of a gasoline dispenser by pneumatic means located on the end of the dispensing hose and having a conduit connection contiguous with the hose and extending into the dispenser casing. The present application is directed to the novel hose construction itself, including a reinforced vulcanized plastic structure containing separate reinforced passages for gasoline and the control fluid, together with a novel means for attaching the hose to a gasoline dispenser.

The more specific features of the invention will be better understood by reference to the accompanying specification and drawing, wherein:

Fig. 1 is a side elevation of the dispensing hose showing in fragmentary section the connection thereof with an adapter fitting;

Fig. 2 is a section on the line 2—2 of Fig. 1; and

Fig. 3 is a slightly enlarged section on the line 3—3 of Fig. 1.

The hose 10 is organized with a typical gasoline dispenser installation, one end of such hose being connected to the discharge fitting 11 of the dispenser, and the free end terminating in an affixed discharge nozzle 12. The hose 10 is formed of a gasoline-resistant vulcanized plastic, and it contains a large gasoline passage 13 and a parallel and relatively smaller control passage 14. As will be seen in Fig. 3, the hose is ovoidal in cross section, and the plastic about the passages 13 and 14 is supplied with cylindrical fabric reinforcing elements 13a and 14a respectively.

The upper and lower extremities of the hose are formed with cylindrical shouldered terminals 16 and 17, respectively, which are concentric with the passage 13. A coupling 18 is formed with a threaded end 19 and an opposed counterbore 21, the end 19 being screwed into the discharge fitting 11, while the counterbore 21 receives the upper hose terminal 16. The coupling 18 is also formed with a boss 22 containing a passage 23 which is aligned with the hose passage 14 and connected thereto by a connecting tube 24. The passage 23 terminates in a threaded hole 25 for receiving a nipple 26. The nipple 26 is connected to a tube 27 which leads to a bellows-operated switch 28 (shown diagrammatically in Fig. 1), or to any other suitable hydraulic or pneumatic control for the pressure motivating elements of the dispenser.

To prevent damage to the hose 10, and possible fracture of the tube 24, the coupling and hose assembly is additionally united by a clamp unit 20, which consists of clamp sections 31 and 32, formed to the contour of the hose. The sections are formed with opposed drilled ears 33 and 34, which receive clamping bolts 35. In order to place the hose under limited compression, a sheet metal strip 36 is carried within the portion of the clamp structure which overlies the hose. It will be apparent that this arrangement prevents flexure of the terminal portion of the hose and adequately protects the tube 24.

The terminal 17 at the free extremity of the hose carries a depressible bulb 38, which may be of annular form, as shown, so that it encircles this end of the hose and thus requires no special mounting means. A connecting tube 39 connects the extremity of the hose passage 14 with the chamber 38a of the bulb.

The control device, including the passage 14 and bulb 38, may contain air or a suitable liquid, which, when the bulb is depressed, will cause the transmission of pneumatic or hydraulic pressure to the switch 28 or like control instrumentality. It will be apparent that during continuous service operation the hose is capable of withstanding extreme flexure and rough handling without imperiling the control connections. It has been found that the hose may be formed with the described passage structure with little difficulty, and that its use in a system similar to that above described removes all difficulties which have been heretofore encountered in the use of tubes attached to standard hose structures.

It will be understood that the hose may be used in various other dispensing systems known in the art, wherein the control conduit may be used in conjunction with other types of control instrumentalities. It will also be noted that the hose may be readily used with an automatic reel or counterweight well, since its reinforced structure and symmetrical formation readily permits coiling or winding thereof without damage.

I claim:

In a gasoline dispenser having a discharge fitting, a dispensing hose having integral gasoline and control fluid passages, said control passage being of a small diameter relative to said gasoline passage, a coupling having passages therethrough registering with said gasoline and control fluid passages of the hose, said coupling and hose being formed to provide a leak-proof connection of the large passages thereof, a tube connecting the small passages in the fitting and hose, clamping means engaging about the fitting and adjoining portion of the hose, said means being formed to apply a light compressive load to said adjoining portion of the hose, and interengaging means on the coupling and discharge fitting for establishing liquid communication between the gasoline passage of the hose and said fitting.

DAVID J. NELSON.